(No Model.)
A. S. McCLURE & C. E. FRI.
CORN HARVESTER.
No. 456,657. Patented July 28, 1891.
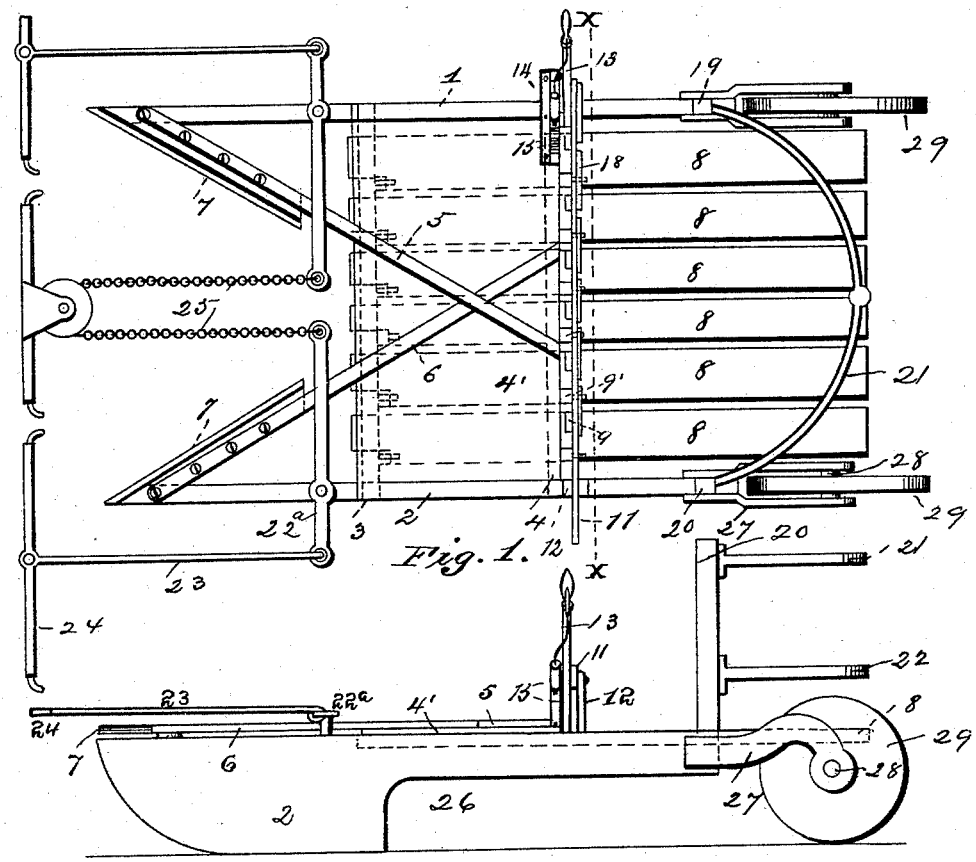
Fig. 1.
Fig. 2.
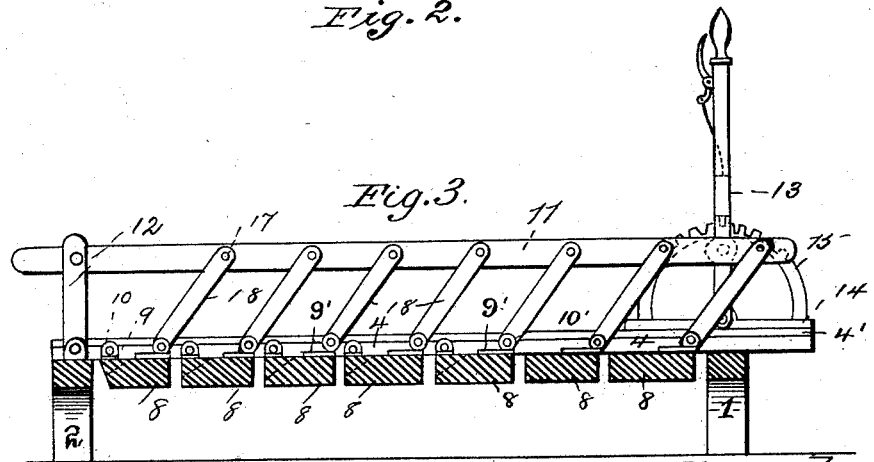
Fig. 3.
Witnesses
W. B. Harris
Denis J. Downing
Inventors
Almer S. McClure
Charles E. Fri
By W. W. Fitz-Gerald & Co.
Attorneys

UNITED STATES PATENT OFFICE.

ALMER S. McCLURE AND CHARLES E. FRI, OF ELKHART, MISSOURI.

CORN-HARVESTER.

SPECIFICATION forming part of Letters Patent No. 456,657, dated July 28, 1891.

Application filed December 17, 1890. Serial No. 375,003. (No model.)

*To all whom it may concern:*

Be it known that we, ALMER S. MCCLURE and CHARLES E. FRI, citizens of the United States of America, residing at Elkhart, in the county of Bates and State of Missouri, have invented certain new and useful Improvements in Corn-Harvesters, of which the following is a specification, reference being had therein to the accompanying drawings.

Our invention has relation to corn-harvesters; and it consists in the construction and novel arrangement of parts, as hereinafter more fully described, illustrated in the accompanying drawings, and pointed out in the appended claims.

The object of our invention is to provide a corn-harvester whereby two rows of corn may be cut at one time; further, to provide means whereby the corn is tilted from the harvester when a sufficient number of bundles have been placed thereon.

In the drawings, Figure 1 is a plan view of a corn-harvester embodying our invention. Fig. 2 is a side view of the same. Fig. 3 is a transverse sectional view thereof on the line *x x* of Fig. 1.

Referring to the accompanying drawings, in which like numerals indicate corresponding parts in all the figures, 1 and 2 designate the sides or runners of our harvester, united near their forward and middle parts by transverse timbers 3 and 4, upon which a suitable flooring 4' is placed for the operator to stand upon. Secured to the forward ends of the runners and at suitable distance above the ground are beams 5 and 6, which are secured to the flooring of the harvester diagonally from side to side.

Rigidly bolted or otherwise secured to the lower edges of the beams 5 and 6 at their outer ends are cutting-knives 7, which, as shown, occupy the same angle as the beams 5 and 6.

8 8 8 designate boards placed longitudinally of the harvester, and are hinged at one edge to the transverse bars 3 and 4, and have secured to them upon their upper faces in rear of the timber 4 metallic plates 9, provided at one end with an upstanding eye 10, for a purpose presently explained.

11 designates a rod pivoted at one end to an upstanding arm 12, pivoted to the top edge of the runner 2, its opposite end being connected to a lever 13, pivoted to a lug on a frame 14. Rising from the frame is a segmental rack 15, provided upon its upper edge with teeth engaged by a spring-controlled dog or catch carried by the lever 13. At suitable points on the rod 11 are formed eyes 17, in which are pivoted links 18, their opposite ends pivoted in the eyes 10' on plates 9', secured to the boards 8.

In order that the corn may be held in a vertical position, so as to make it easy for the operator to bundle the same, we secure to the runners 1 2 vertical posts 19 and 20, to which are secured iron rods 21 and 22, forming a rest for the corn. Near the forward ends of the runners and upon their upper edges are secured eveners 22ª, which are provided at their outer ends with the forwardly-extending rods 23 and have pivoted to them whiffletrees 24. At the inner ends of the eveners 22ª is secured a chain 25, which passes over a grooved pulley secured centrally to a middle singletree, thus permitting the horses to be worked to the harvester. At the rear of the harvester the runners are cut away, as at 26, and arms 27 secured thereto, said arms provided in their outer ends with shafts 28, which carry the wheels 29.

The operation of our improved corn-harvester, taken in connection with the above description and accompanying drawings, may be briefly described as follows: As the machine passes along the rows of corn the knives sever the stalks, and the operator places them in bundles on the rear of the frame against the iron rods, and when a sufficient number of bundles have been cut the operator by tripping the spring-controlled dog allows the longitudinal boards, owing to their pivotal and hinged connection, to tilt and allow the bundles of corn to be dropped from the machine.

Having thus fully described our invention, what we claim as new, and desire to secure by Letters Patent, is—

1. In a corn-harvester, the combination, with the main frame supported by runners at its forward part and upon wheels at its rear, of the dumping-platform consisting of longitudinal bars hinged at one edge to the transverse timbers, the plates on the bars, having a link connection with a transverse bar movable in the direction of its length and provided with eyes, and a spring-controlled dog carried by the operating-lever for holding the bars in a raised position by means of the transverse bar, substantially as described.

2. In a corn-harvester, the combination, with the main frame supported on runners and wheels provided at its front with angularly-placed knives, of the dumping-platform constructed in longitudinal sections hinged to the transverse timbers, the plates on the sections, having a link connection with a transverse bar movable in the direction of its length and provided with eyes, and the spring-controlled dog secured to the operating-lever above the dumping-platform for holding said sections in a raised position by means of the transverse bar, substantially as described.

3. The combination, with the main frame supported on runners and wheels and provided at its forward end with angularly-placed knives, of the dumping-frame constructed in longitudinal sections, each hinged at one edge to transverse timbers on the said frame and having connection with an actuating-lever carrying a spring-controlled dog, said connection comprising the pivoted arm on the frame, the links pivoted to said sections, and the rod connected to said links, arm, and lever, and the rods secured to the posts on the upper edges of the runners and forming a rest for the shocks, substantially as set forth.

In testimony whereof we affix our signatures in presence of two witnesses.

ALMER S. McCLURE.
CHARLES E. FRI.

Witnesses:
G. O. THOMPSON,
J. J. VAIL.